US012581490B2

(12) United States Patent
Park et al.

(10) Patent No.: US 12,581,490 B2
(45) Date of Patent: Mar. 17, 2026

(54) METHOD AND APPARATUS FOR IUC OPERATION BASED ON TIMER IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 578 days.

(21) Appl. No.: 17/977,869

(22) Filed: Oct. 31, 2022

(65) Prior Publication Data

US 2023/0254862 A1     Aug. 10, 2023

(30) Foreign Application Priority Data

Feb. 9, 2022     (KR) ........................ 10-2022-0017058

(51) Int. Cl.
 *H04W 24/10* (2009.01)
 *H04W 72/20* (2023.01)
(52) U.S. Cl.
 CPC ........... *H04W 72/20* (2023.01); *H04W 24/10* (2013.01)
(58) Field of Classification Search
 CPC ............................... H04L 12/28; H04L 12/50
 USPC .................................. 370/329, 401, 402, 405
 See application file for complete search history.

(56) References Cited

U.S. PATENT DOCUMENTS

2024/0334522 A1* 10/2024 Farag .................... H04W 24/08

FOREIGN PATENT DOCUMENTS

CN          112752293          5/2021

OTHER PUBLICATIONS

LG, "Summary of [POST116bis-e][707][V2X/SL] Open issues on IUC, Phase 1," 3GPP TSG-RAN WG2 #116bis electronic, online, R2-2201807, Jan. 2022, 20 pages.
Nokia, "Inter-UE coordination for Mode 2 enhancements," 3GPP TSG-RAN WG1 #106-e, R1-2106532, Aug. 2021, 21 pages.
Japan Patent Office Application Serial No. 2022-172940, Office Action dated Jun. 13, 2023, 2 pages.
European Patent Office Application Serial No. 22202763.3, Search Report dated Apr. 13, 2023, 10 pages.
LG Electronics Inc., "Summary [AT116b-e][704][V2X/SL] Resource allocation enhancements," 3GPP TSG-RAN WG #116b-e, R2-2201804, Nov. 2021, 9 pages.
Korean Intellectual Property Office Application No. 10-2022-0118102, Office Action dated Jan. 17, 2025, 5 pages.

(Continued)

*Primary Examiner* — Dang T Ton
(74) *Attorney, Agent, or Firm* — LEE, HONG, DEGERMAN, KANG & WAIMEY

(57)          ABSTRACT

A method of operating a first device 100 in a wireless communication system is proposed. The method may include: receiving, from a second device 200, an IUC request; triggering an IUC information report based on the IUC request; starting an IUC report timer related to a transmission of IUC information based on the triggered IUC information report; transmitting the IUC information to the second device 200 based on the IUC report timer being running; stopping the IUC reporting timer based on the IUC information being transmitted; and canceling the triggered IUC information report based on the IUC information being transmitted.

15 Claims, 17 Drawing Sheets

(56)  References Cited

OTHER PUBLICATIONS

Ericsson, "Design of inter-UE coordination MAC CE," R2-2200939, 3GPP TSG-RAN WG2 #116bis-e, Electronical meeting, Jan. 2022, 6 pages.

RAN2, "LS to RAN1 on Inter-UE coordination," R2-2201809, 3GPP TSG RAN WG2 Meeting #116bis-e, Electronic meeting, Jan. 2022, 2 pages.

State Intellectual Property Office of the People's Republic of China Application Serial No. 202211369351.0, Office Action dated Jun. 13, 2025, 6 pages.

* cited by examiner

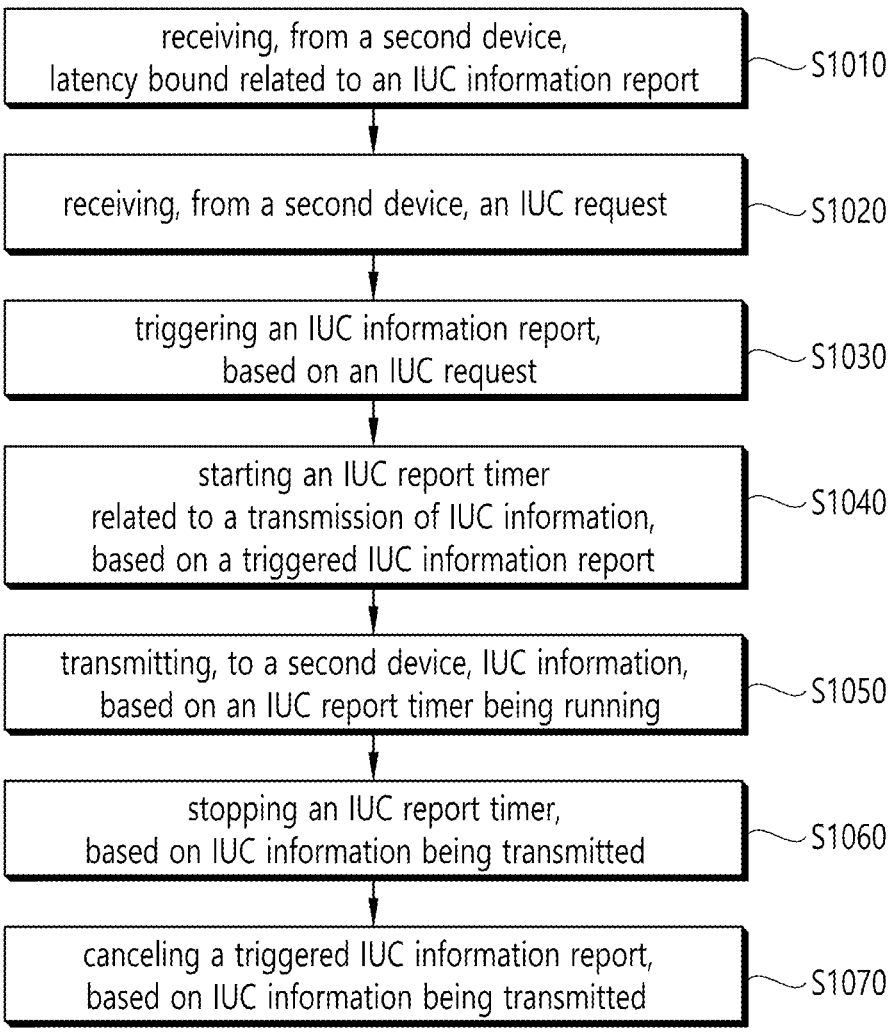

receiving, from a second device,
latency bound related to an IUC information report  ～S1010 receiving, from a second device, an IUC request  ～S1020 triggering an IUC information report,
based on an IUC request  ～S1030 starting an IUC report timer
related to a transmission of IUC information,
based on a triggered IUC information report  ～S1040 transmitting, to a second device, IUC information,
based on an IUC report timer being running  ～S1050 stopping an IUC report timer,
based on IUC information being transmitted  ～S1060 canceling a triggered IUC information report,
based on IUC information being transmitted  ～S1070

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 17

METHOD AND APPARATUS FOR IUC OPERATION BASED ON TIMER IN NR V2X

CROSS-REFERENCE TO RELATED APPLICATION(S)

Pursuant to 35 U.S.C. § 119(a), this application claims the benefit of earlier filing date and right of priority to Korean Patent Application No. 10-2022-0017058, filed on Feb. 9, 2022, the contents of which are hereby incorporated by reference herein in its entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: receiving, from a second device, latency bound related to an inter UE coordination (IUC) information report; receiving, from the second device, an IUC request; triggering the IUC information report, based on the IUC request; starting an IUC report timer related to a transmission of IUC information, based on the triggered IUC information report, wherein a timer value of the IUC report timer may be the same as the latency bound; transmitting, to the second device, the IUC information, based on the IUC report timer being running; stopping the IUC report timer, based on the IUC information being transmitted; and canceling the triggered IUC information report, based on the IUC information being transmitted.

According to an embodiment of the disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive, from a second device, latency bound related to an inter UE coordination (IUC) information report; receive, from the second device, an IUC request; trigger the IUC information report, based on the IUC request; start an IUC report timer related to a transmission of IUC information, based on the triggered IUC information report, wherein a timer value of the IUC report timer may be the same as the latency bound; transmit, to the second device, the IUC information, based on the IUC report timer being running; stop the IUC report timer, based on the IUC information being transmitted; and cancel the triggered IUC information report, based on the IUC information being transmitted.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive, from a second UE, latency bound related to an inter UE coordination (IUC) information report; receive, from the second UE, an IUC request; trigger the IUC information report, based on the IUC request; start an IUC report timer related to a transmission of IUC information, based on the triggered IUC information report, wherein a timer value of the IUC report timer may be the same as the latency bound; transmit, to the second UE, the IUC information, based on the IUC report timer being running; stop the IUC report timer, based on the IUC information being transmitted; and cancel the triggered IUC information report, based on the IUC information being transmitted.

According to an embodiment of the present disclosure, a non-transitory computer-readable storage medium storing instructions may be proposed. For example, the instructions, when executed, may cause a first device to: receive, from a second device, latency bound related to an inter UE coordination (IUC) information report; receive, from the second device, an IUC request; trigger the IUC information report, based on the IUC request; start an IUC report timer related to a transmission of IUC information, based on the triggered IUC information report, wherein a timer value of the IUC report timer may be the same as the latency bound; transmit, to the second device, the IUC information, based on the IUC report timer being running; stop the IUC report timer, based on the IUC information being transmitted; and cancel the triggered IUC information report, based on the IUC information being transmitted.

According to an embodiment of the present disclosure, a method for performing, by a second device, wireless communication may be proposed. For example, the method may comprise: transmitting, to a first device, latency bound related to an inter UE coordination (IUC) information report; transmitting, to the first device, an IUC request; and receiving, from the first device, IUC information, based on an IUC report timer related to a transmission of the IUC information being running, wherein the IUC information report may be triggered based on the IUC request, wherein the IUC report timer may be started based on the triggered IUC information report, wherein a timer value of the IUC report timer may be the same as the latency bound, wherein the IUC report timer may be stopped based on the IUC information being transmitted from the first device, and wherein the triggered IUC information report may be canceled based on the IUC information being transmitted from the first device.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: transmit, to a first device, latency bound related to an inter UE coordination (IUC) information report; transmit, to the first device, an IUC request; and receive, from the first device, IUC information, based on an IUC report timer related to a transmission of the IUC information being running, wherein the IUC information report may be triggered based on the IUC request, wherein the IUC report timer may be started based on the triggered IUC information report, wherein a timer value of the IUC report timer may be the same as the latency bound, wherein the IUC report timer may be stopped based on the IUC information being transmitted from the first device, and wherein the triggered IUC information report may be canceled based on the IUC information being transmitted from the first device.

The user equipment (UE) may efficiently perform retransmission based on hybrid automatic repeat request (HARQ) feedback.

BRIEF DESCRIPTION OF THE DRAWINGS

FIG. 2 shows a radio protocol architecture, based on an embodiment of the present disclosure.

FIG. 10 shows a procedure in which a first device performs wireless communication, according to an embodiment of the present disclosure.

FIG. 17 shows a vehicle or an autonomous vehicle, based on an embodiment of the present disclosure.

DETAILED DESCRIPTION

Figure 1:
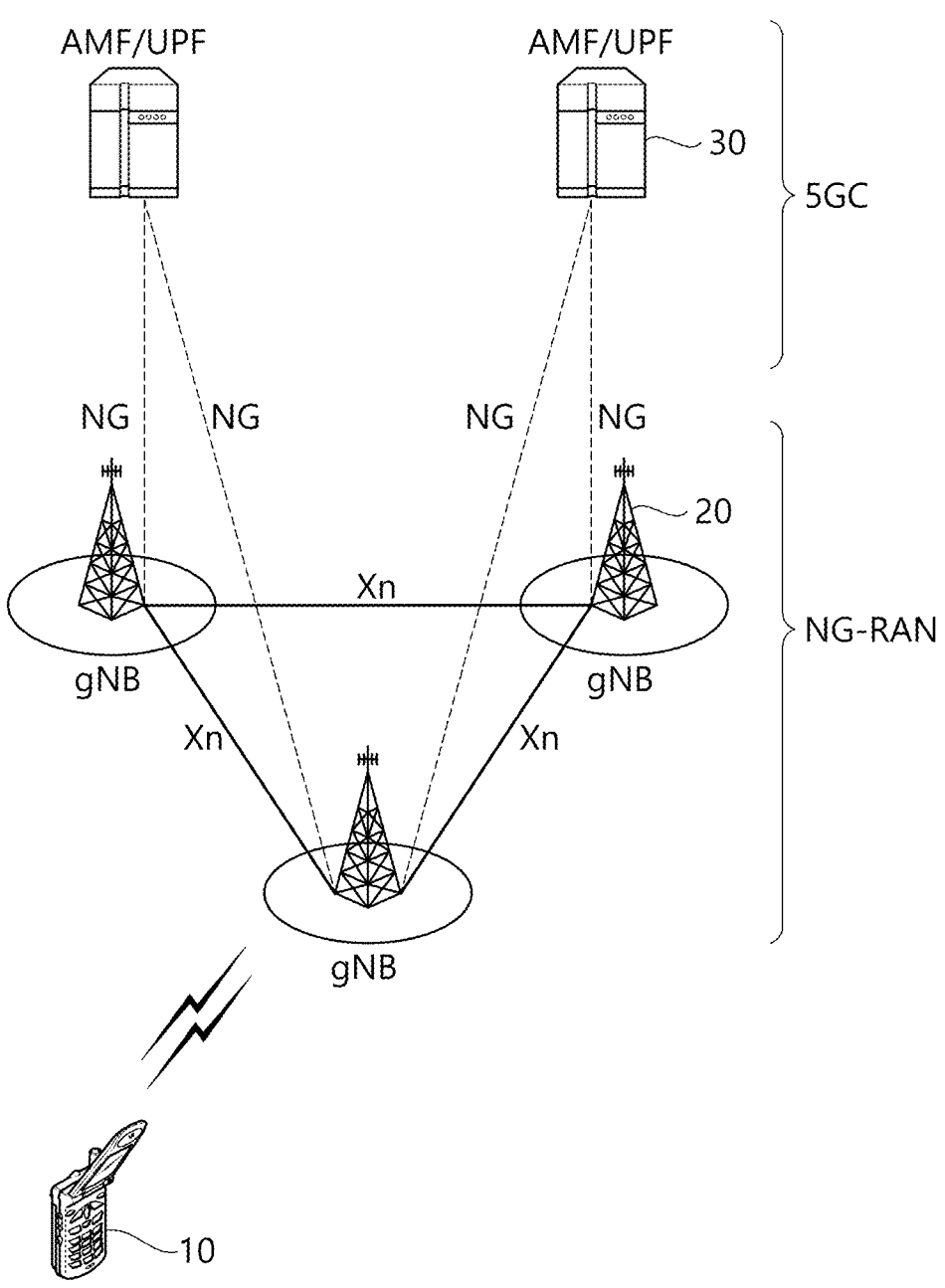
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or predefined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, a wireless communication standard document published before the present specification is filed may be referred to.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
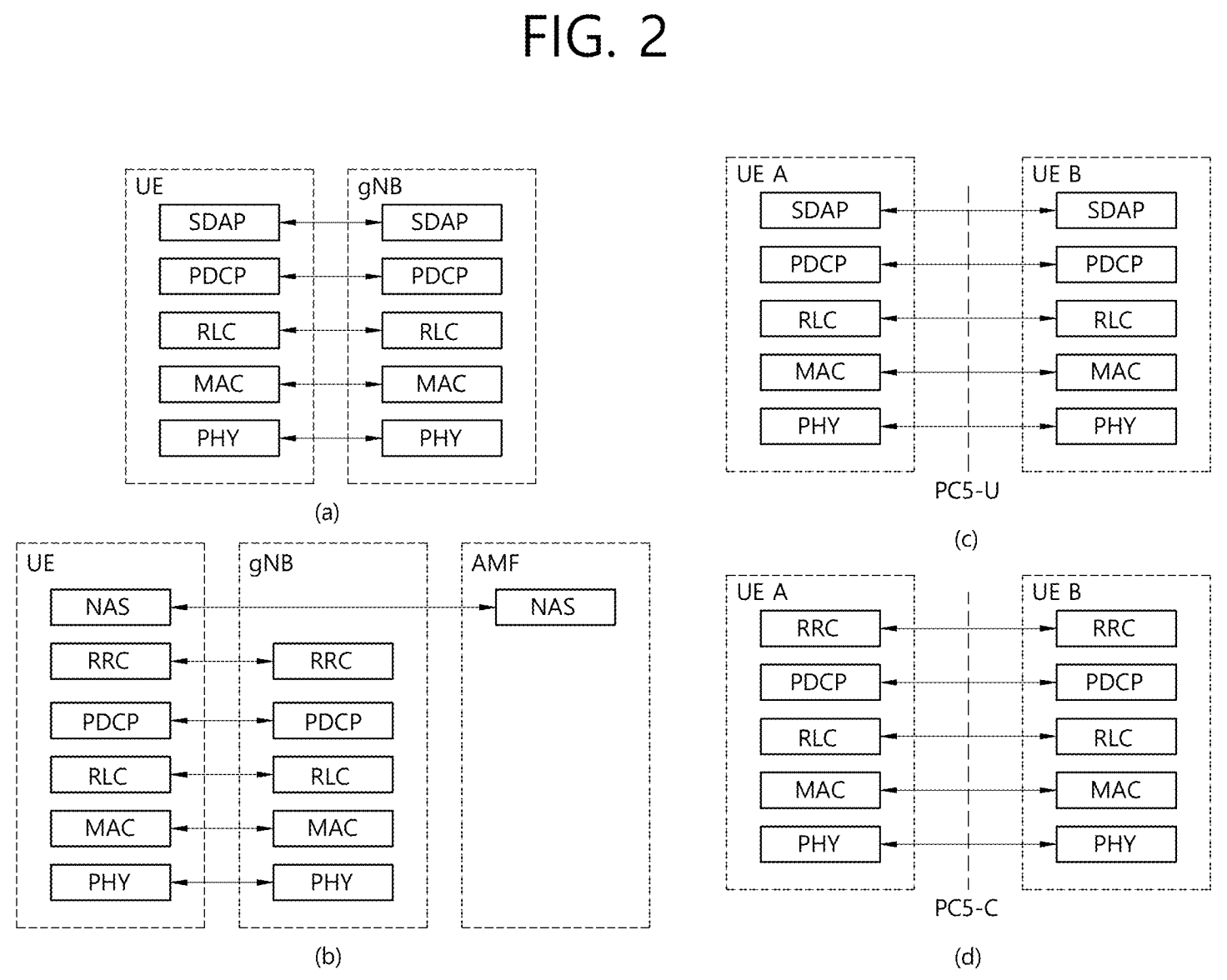

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
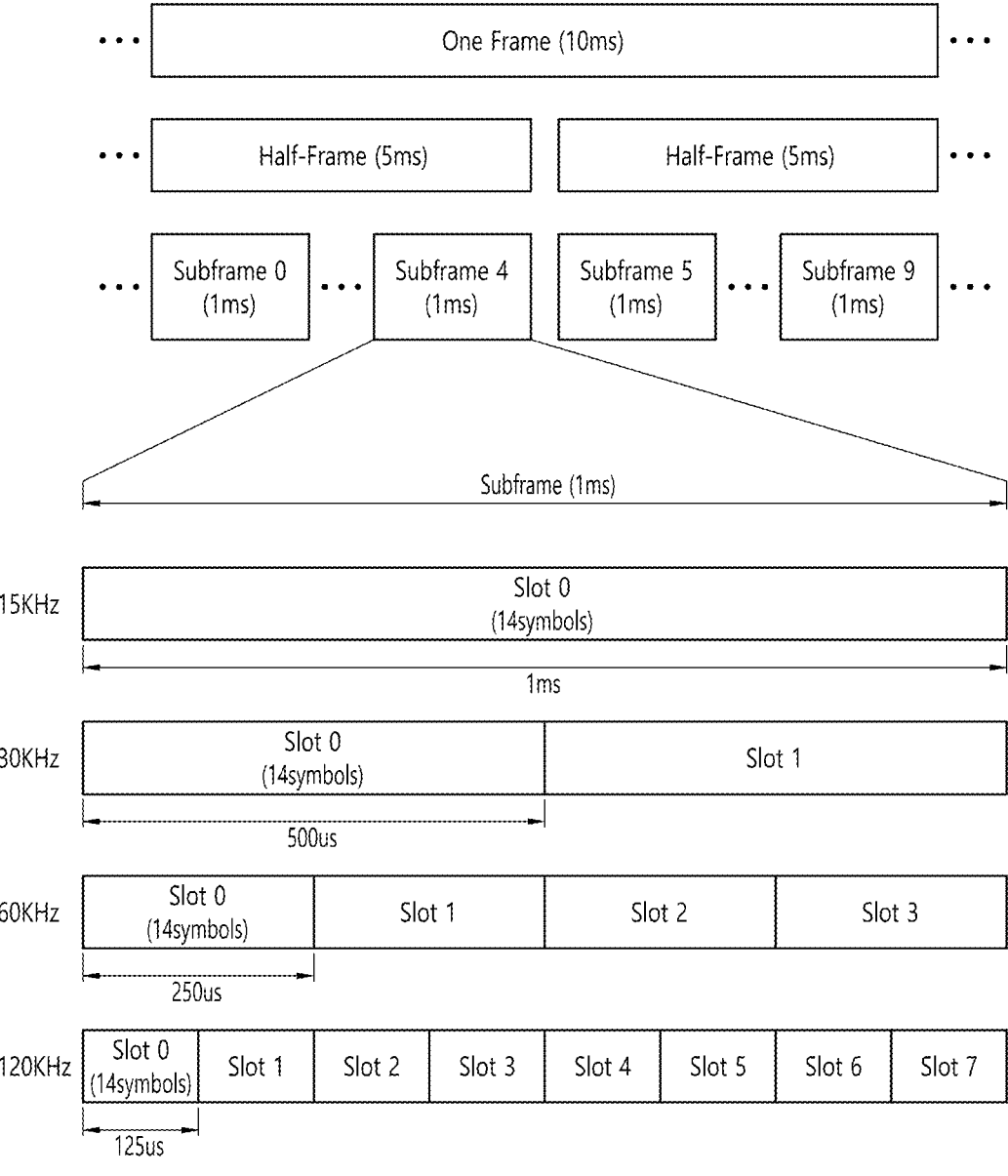
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
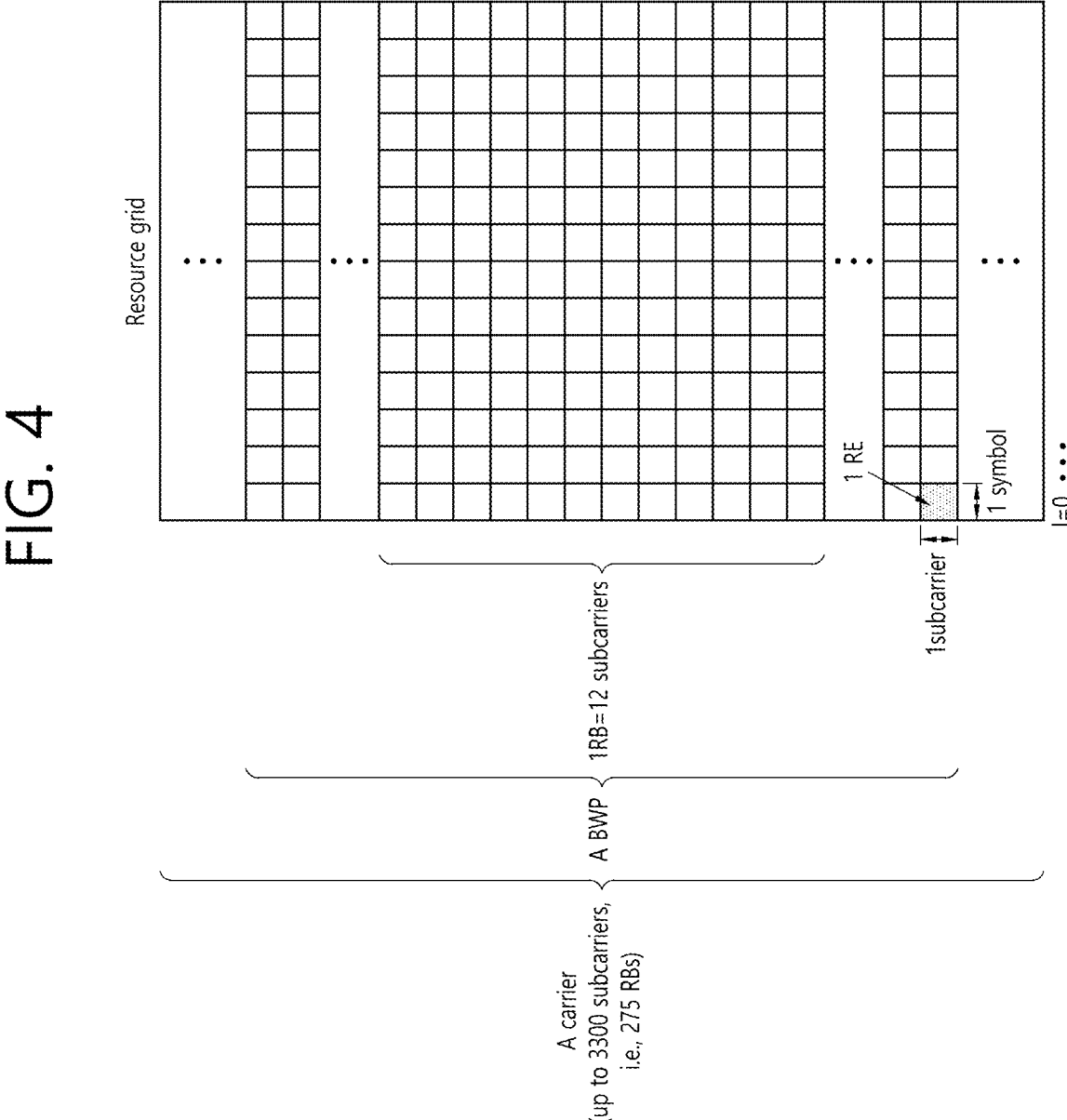
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on).

A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
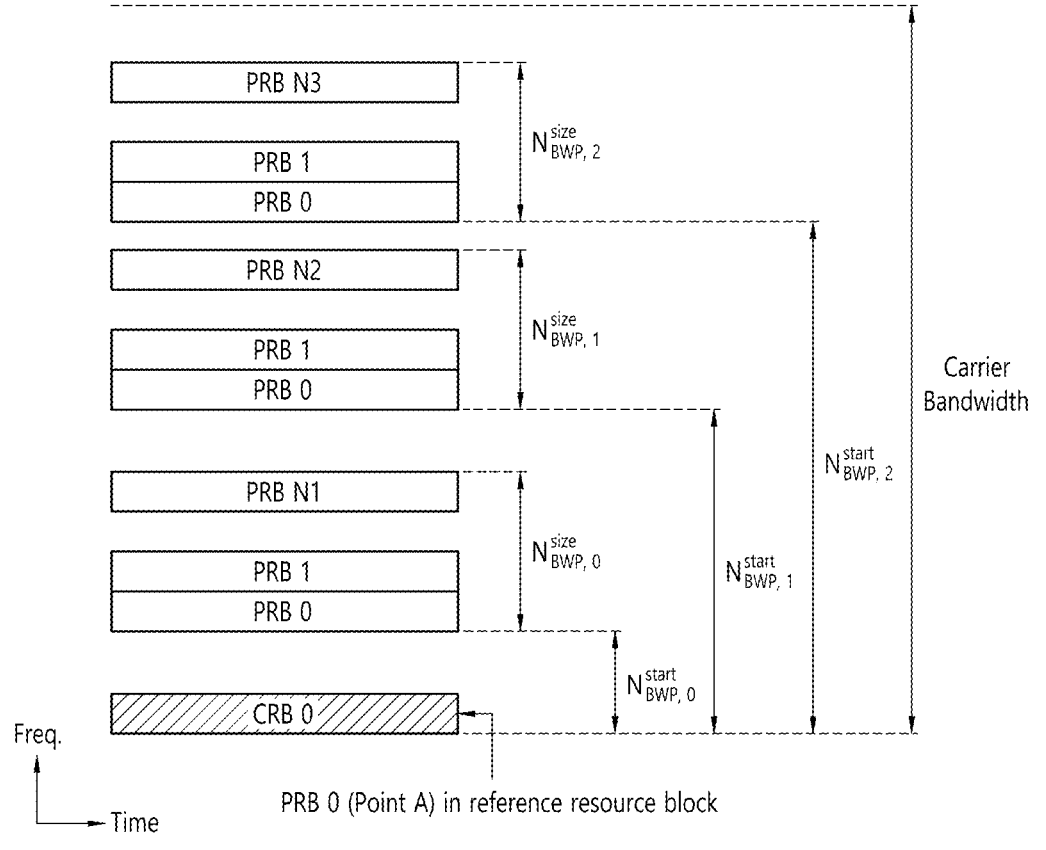
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
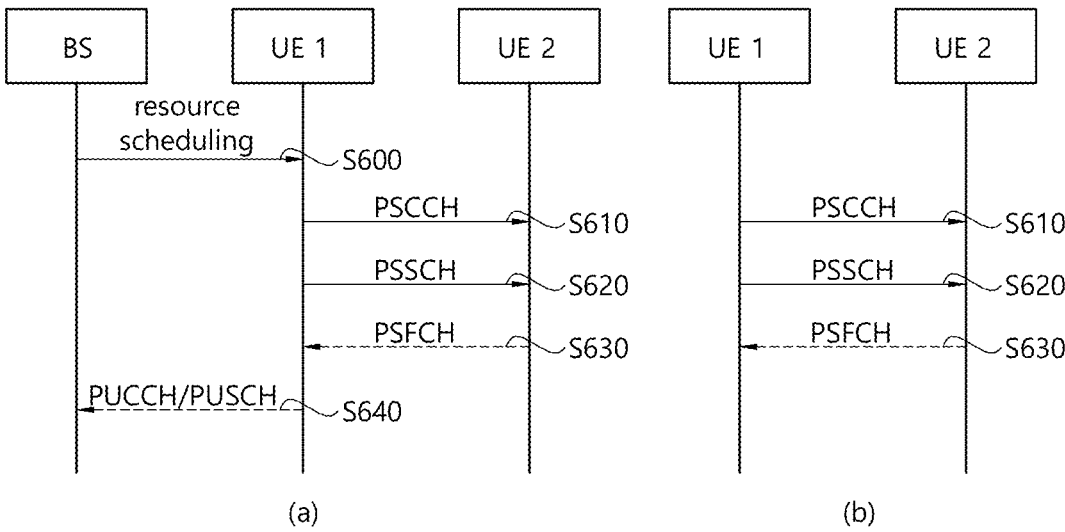
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/ report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/ PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
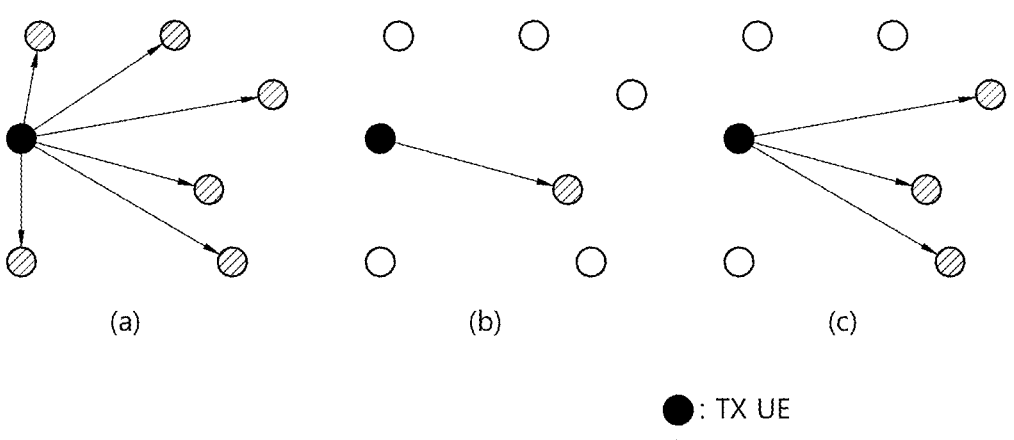
FIG. 7 shows three cast types, based on an embodiment of the present disclosure.

FIG. 7 shows three cast types, in accordance with an embodiment of the present disclosure. The embodiment of FIG. 7 may be combined with various embodiments of the present disclosure. Specifically, FIG. 7(*a*) shows broadcast-type SL communication, FIG. 7(*b*) shows unicast type-SL communication, and FIG. 7(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

In this specification, the "configure or define" wording may be interpreted as being (pre)configured (via pre-defined signaling (e.g., SIB, MAC signaling, RRC signaling)) from a base station or a network. For example, "A may be configured" may include "that a base station or network (pre-)configures/defines or informs A for a UE". Alternatively, the wording "configure or define" may be interpreted as being configured or defined in advance by a system. For example, "A may be configured" may include "A is configured/defined in advance by a system".

According to an embodiment of the present disclosure, the following Inter-UE Coordination (IUC) operation may be proposed.

For example, whether the (a part of) proposed method/ rule of the present disclosure is applied and/or related parameters (e.g., threshold values) may be configured specifically (or differently, or independently) according to resource pool, congestion level, service priority (and/or type), QoS requirements (e.g., delay, reliability) or PQI, traffic type (e.g., (non-) periodic generation), SL transmission resource allocation mode (Mode 1, Mode 2), etc.

For example, whether the proposed rule of the present disclosure is applied (and/or related parameter configuration value) may be configured specifically (and/or independently and/or differently) for at least one of a resource pool, service/packet type (and/or priority), QoS profile or QoS requirements (e.g., URLLC/EMBB traffic, reliability, delay), PQI, PFI, cast type (e.g., unicast, groupcast, broadcast), (resource pool) congestion level (e.g., CBR), SL HARQ feedback scheme (e.g., NACK Only feedback), ACK/NACK feedback), the case of HARQ feedback enabled MAC PDU (and/or HARQ feedback disabled MAC PDU) transmission, the case of PUCCH-based SL HARQ feedback reporting operation configuration, pre-emption (and/or re-evaluation) performance (or based resource reselection), (L2 or L1) (source and/or destination) identifier, (L2 or L1) (combination of source layer ID and destination layer ID) identifier, (L2 or L1) (source layer ID and destination layer ID pair, and cast type combination) identifier, a direction of a pair of source layer ID and destination layer ID, PC5 RRC connection/link, SL DRX (non) performing (or supporting) case, an SL mode type (resource allocation mode 1, resource allocation mode 2), (a)periodic resource reservation execution, a case in which a request-based IUC operation is performed, a case in which a condition-based IUC operation is performed, a case in which preferred resource set information is transmitted through IUC information MAC CE, a case in which non-preferred resource set information is transmitted through IUC information MAC CE.

Also, for example, whether the proposal and proposal rule of the present disclosure are applied (and/or related parameter configuration values) may also be applied to mmWave SL operation.

Hereinafter, content related to a timer for controlling a latency bound of inter-UE coordination (IUC) will be described. According to an embodiment of the present disclosure, since IUC information is time-sensitive, it can be guaranteed that IUC information is transmitted to a MAC layer according to time. For example, two options may be possible for this purpose. That is, for example, an option to introduce a mechanism such as a CSI reporting function (i.e., timer-based) for IUC MAC CE transmission, or an option according to UE implementation may be possible.

For example, in the case of request-based IUC, information on a selection window for resource set determination may be provided through a request message transmitted from UE B to UE A. For example, in the case of condition-based IUC, a selection window may be determined by a UE implementation. For example, for resource selection for transmitting IUC information, the following operation may be possible.

TABLE 5

| |
|---|
| ● RAN1 agreement: |
|   - For Scheme 1, when the inter-UE coordination information transmission is triggered by UE-B's explicit request, |
|     • Starting/Ending time locations of resource selection window is provided by UE-B's explicit request |
|       ✓ Starting/Ending time locations of resource selection window is a form of combination of DFN index and slot index |

TABLE 6

| |
|---|
| ● RAN1 agreement: |
|   - For determining preferred resource set in Scheme 1, when inter-UE coordination information transmission is triggered by a condition other than explicit request reception, |
|     • Values of following parameters are (pre)configured for a resource pool. If there is no (pre)configuration, UE-A determines by its implementation the values of the following parameters |
|       ✓ prio_TX |
|       ✓ L_subCH |
|       ✓ P_rsvp_TX |
|     • UE-A determines by its implementation values of following parameters |
|       ✓ n+T_1, n+T_2 |
|     • FFS: Whether/how to support (pre)configuration of n+T_1 and n+T_2 |
| Note that it is up to RAN2 decision whether/how the values of these parameters are provided by PC5-RRC signaling from UE-B to UE-A and UE-A uses the received information to determine the preferred resource set |

TABLE 7

| |
|---|
| ● RAN1 agreement: |
|   - For sidelink transmission carrying inter-UE coordination information in Scheme 1, |
|     • UE-A performs its resource (re)selection according to the same procedure in TS 38.214 Section 8.1.4 to transmit the inter-UE coordination information to UE-B. |
|   - For sidelink transmission carrying request in Scheme 1, |
|     • UE-B performs its resource (re)selection according to the same procedure in TS 38.214 Section 8.1.4 to transmit the request for the inter-UE coordination information to UE-A if UE-B performs sensing/resource exclusion. Otherwise, at least UE-B can perform random selection |
|   - Note: RAN1 does not pursue specific enhancement of Rel-17 resource (re)selection for the transmission of inter-UE coordination information and its request. |

For example, according to the above tables, when UE A decides to transmit IUC information to UE B, the latest timing at which IUC information can be transmitted may be implicitly interpreted as an end point of a selection window for determining a resource set.

That is, in terms of considering an additional latency bound in an IUC scenario, it may be sufficient to leave it to the implementation of UE A.

According to an embodiment of the present disclosure, when a type-B UE (SL data transmission UE) receives an IUC MAC CE from a type-A UE (a UE transmitting IUC MAC CE), it selects a resource for SL data transmission with reference to the received IUC-MAC CE information. In addition, a type-B UE may request transmission of an IUC MAC to a type-A UE by transmitting an IUC request MAC requesting IUC MAC transmission. A type-A UE receiving an IUC request MAC CE from a type-B UE may transmit an IUC MAC CE to the type-B UE.

IUC MAC CE described in this disclosure refers to MAC CE including IUC information (e.g., including preferred/ non-preferred recommended resource information), and an IUC request MAC CE refers to a MAC CE requesting the IUC MAC CE.

For example, an IUC MAC (MAC CE including IUC information) type may include the following.

1. Request-based IUC MAC CE: It may mean an IUC MAC CE that UE A transmits to UE B in response when UE A receives an IUC request MAC CE from UE B.

2. Condition-based IUC MAC CE: It may mean an IUC MAC CE that is triggered and transmitted when a specific condition is satisfied to UE A, rather than request-based IUC MAC CE transmission.

According to an embodiment of the present disclosure, a timer-based latency bound restriction for the UE A to transmit IUC information may be proposed. For example, according to an embodiment of the present disclosure, a timer-based mechanism for transmitting IUC information of UE A is proposed. For example, the timer may be a timer for handling latency bound on transmission.

According to an embodiment of the present disclosure, following options may be provided in a scenario (e.g., in a case of an explicit request or in a case of a condition) for latency bound by which a UE A transmits IUC information.

1. In Case of Explicit Request (Only)

According to an embodiment of the present disclosure, a method of applying a timer-based mechanism for transmitting IUC information of UE A only when UE A receives an explicit request MAC CE requesting IUC information from UE B during condition-based IUC operation is proposed.

That is, for example, when UE A receives an explicit request MAC CE for IUC information MAC CE transmission from UE B, the UE A may generate IUC information MAC CE and transmit it to the UE B.

At this time, for example, UE A may operate a timer set to a latency bound (restriction of latency that must transmit IUC information within time), may have to transmit the IUC information MAC CE to UE B before the timer expires, that is, in a state in which transmission is triggered and has not yet been transmitted. If the UE A fails to perform the IUC information MAC CE transmission within the latency bound, the UE A may cancel the pending IUC information MAC CE transmission.

2. In Case of Condition-Based

According to an embodiment of the present disclosure, a method of applying a timer-based mechanism for IUC information transmission of UE A when a specific condition is met for the UE A during condition-based IUC operation, that is only to a condition-based case is proposed. For example, the specific condition may include a case in which transmission is triggered in a higher layer (V2X layer, or RRC layer).

That is, for example, when a specific condition is satisfied and an IUC information MAC CE transmission is triggered, UE A may generate an IUC information MAC CE and transmit it to UE B. In this case, UE A may operate a timer set to a latency bound and may have to transmit IUC information MAC CE to UE B before the timer expires. If the UE A fails to perform the IUC information MAC CE transmission within the latency bound, the UE A may cancel the pending IUC information MAC CE transmission.

According to an embodiment of the present disclosure, an option for latency bound for IUC information transmission of UE A in condition-based IUC is proposed. For example, the option may include introducing a latency bound restriction only for unicast in IUC based on condition. For example, the option may include introducing a latency bound restriction for GC/BC (for a non-preferred resource set) in the condition-based IUC.

1. Introduce Latency Bound Restriction Only for Unicast in IUC Based on Condition According to an embodiment of the present disclosure, a method is proposed in which a timer-based mechanism for transmitting IUC information of UE A is applied only when UE A meets a specific condition and the transmission cast type is unicast in a condition-based IUC operation (i.e. condition-based and unicast transmission). For example, the specific condition may include a case in which transmission is triggered in a higher layer.

That is, for example, UE A may generate and transmit IUC information MAC CE to UE B when a PC5 unicast link is established with UE B, and a specific condition is satisfied and thus IUC information MAC CE transmission is triggered. In this case, UE A operates a timer set to a latency bound and may have to transmit IUC information MAC CE to UE B before the timer expires. If the UE A fails to perform the IUC information MAC CE transmission within the latency bound, the UE A may cancel the pending IUC information MAC CE transmission.

2. Introduce Latency Bound Restriction for GC (for Non-Preferred Resource Set) in Condition-Based IUC According to an embodiment of the present disclosure, it is proposed to apply a timer-based mechanism for IUC information transmission of UE A only when UE A satisfies a specific condition (triggering transmission in the upper layer (V2X layer or RRC layer), etc.), the transmission cast type is groupcast, and non-preferred resource set information is delivered as IUC information in condition-based IUC operation (that is, in the case of condition-based and groupcast transmission and in the case of delivering a non-preferred resource set as IUC information).

That is, UE A may generate IUC information MAC CE and transmit it to UE B when PC5 unicast link are established with UE B and a specific condition is satisfied to UE A, and IUC information MAC CE transmission is triggered. In this case, UE A may operate a timer set to a latency bound (e.g., this is a state in which a transfer has been triggered but has not yet been sent) and may have to transmit IUC information MAC CE to UE B before the timer expires.

3. Introduce Latency Bound Restrictions on BC (for Non-Preferred Resource Set) in Condition-Based IUC According to an embodiment of the present disclosure, it is proposed to apply a timer-based mechanism for IUC information transmission of UE A in condition-based IUC behavior, only when UE A satisfies a specific condition (triggering transmission in a higher layer (V2X layer or RRC layer), etc.), the transmission cast type is broadcast, and non-preferred resource set information is delivered as IUC information (that is, in the case of condition-based and broadcast transmission and in the case of delivering a set of non-preferred resources as IUC information).

That is, when UE A has a PC5 unicast link established with UE B and UE A is triggered to transmit IUC information MAC CE because a specific condition is satisfied, the UE A may generate IUC information MAC CE and transmit it to UE B. In this case, UE A may operate a timer set to a latency bound (e.g., when transmission is triggered, it is not transmitted yet), so that it may have to transmit IUC information MAC CE to UE B before the timer expires. If the UE A fails to perform an IUC information MAC CE transmission within the latency bound, the UE A may cancel the pending IUC information MAC CE transmission.

According to an embodiment of the present disclosure, an option for latency bound for IUC information transmission of UE A is proposed. For example, the option may include an option to apply only a preferred resource set, an option to apply only a non-preferred resource set, or an option to use both resource sets.

1. Using Only Preferred Resource Set

According to an embodiment of the present disclosure, a method of applying a timer-based mechanism for transmitting IUC information of UE A only when UE A transmits preferred resource set information as IUC information in an IUC operation is proposed.

That is, for example, when an IUC information MAC CE transmission is triggered, UE A may generate IUC information MAC CE (including a preferred resource set) and transmit it to UE B. In this case, UE A may operate a timer set to a latency bound, and before the timer expires, it may have to transmit IUC information MAC CE to UE B, that is, when a transmission is triggered and not yet transmitted. If the UE A fails to perform an IUC information MAC CE transmission within the latency bound, the UE A may cancel the pending IUC information MAC CE transmission.

2. Using Only Non-Preferred Resource Set

According to an embodiment of the present disclosure, a method of applying a timer-based mechanism for transmitting IUC information of UE A only when UE A transmits non-preferred resource set information as IUC information in an IUC operation is proposed.

That is, for example, when an IUC information MAC CE transmission is triggered, UE A may generate IUC information MAC CE (including a non-preferred resource set) and transmit it to UE B. In this case, UE A may operate a timer set to a latency bound, and before the timer expires, that is, transmission is triggered and has not yet been transmitted, it may have to transmit IUC information MAC CE to UE B. If the UE A fails to perform an IUC information MAC CE transmission within the latency bound, the UE A may cancel the pending IUC information MAC CE transmission.

According to an embodiment of the present disclosure, a method of setting a timer for IUC information transmission of UE A is proposed.

1. UE B Sets a Timer Value to UE A Through PC5 RRC Signaling

For example, UE B may determine a timer value (latency bound) and transmit the timer value to UE A through PC5 RRC signaling.

2. The Timer is Set Based on (Pre)Configuration of a Network.

For example, a timer value (latency bound) may be set by a base station and informed to the UE or may be preset.

According to an embodiment of the present disclosure, it is proposed for a start time of a timer for IUC information transmission of UE A.

1. A Time Point in which UE A Receives an Explicit Request from UE B

For example, UE A may start a timer for transmitting IUC information MAC CE to UE B at the time of receiving an IUC request MAC CE from the UE B.

For example, UE A may start a timer for transmitting an IUC information MAC CE to UE B when a specific condition (e.g., when transmission is instructed from a higher layer, etc.) is satisfied.

2. A Time Point in which UE A Decides to Transmit IUC Information to UE B in Condition-Based IUC For example, when a specific condition (e.g., when transmission is instructed from a higher layer, etc.) is satisfied, when UE A decides to transmit IUC information MAC CE to UE B, it may start a timer for transmitting IUC information MAC CE.

According to an embodiment of the present disclosure, it is proposed for a stop time of a timer for IUC information transmission of UE A.

For example, when UE A transmits an IUC information MAC CE to UE B, the UE A may stop a timer (set as a latency bound).

Figure 8:
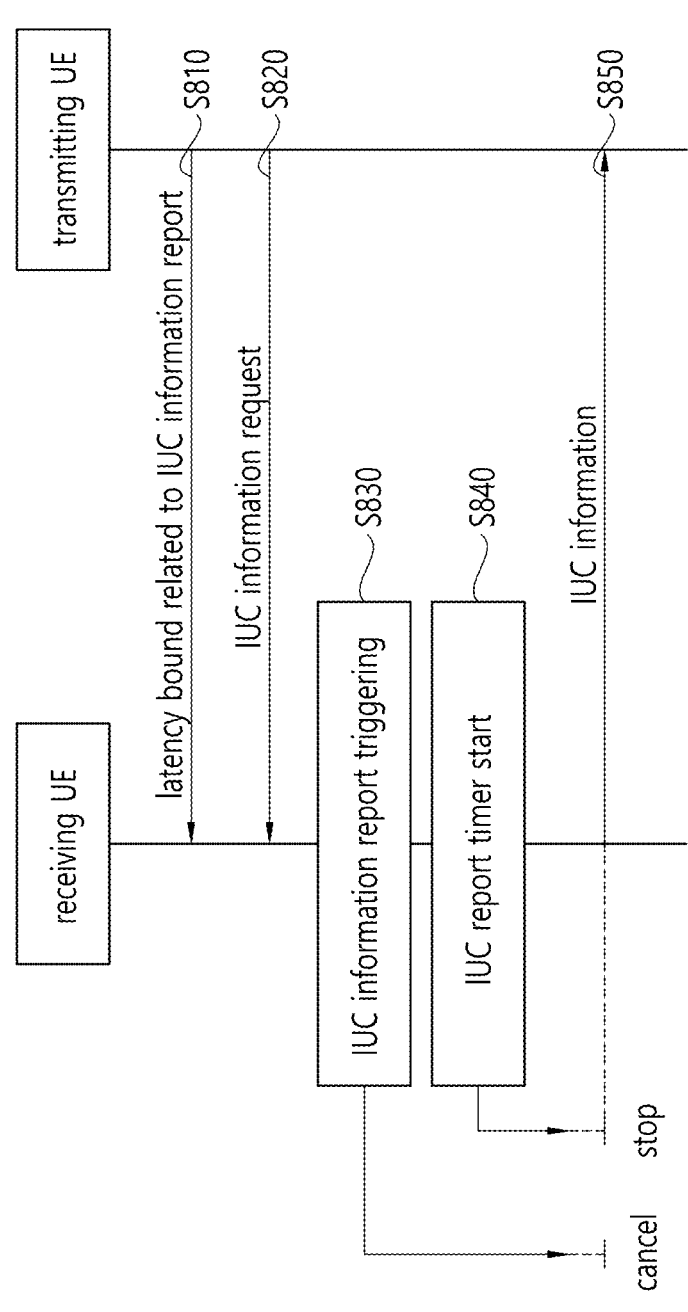
FIG. 8 shows an IUC information reporting procedure of a receiving terminal according to an embodiment of the present disclosure.

FIG. 8 shows an IUC information reporting procedure of a receiving UE according to an embodiment of the present disclosure. The embodiment of FIG. 8 may be combined with various embodiments of the present disclosure.

Referring to FIG. 8, in step S810, a transmitting UE may transmit a latency bound related to an IUC information report to a receiving UE. For example, the latency bound may be transmitted through RRC signaling. For example, the receiving UE may set a timer value for reporting the IUC information to be the same as the latency bound.

In step S820, the transmitting UE may transmit an IUC information request to the receiving UE. In step S830, the receiving UE may trigger an IUC information reporting procedure based on a reception of the IUC information request (or the fulfillment of a condition related to the IUC information reporting procedure). In step S840, the receiving UE may start a timer for reporting the IUC information based on the triggered IUC information reporting procedure.

In step S850, based on the timer for reporting the IUC information being running, the receiving UE may transmit the IUC information to the transmitting UE. In this case, the receiving UE may stop the timer based on the transmission of the IUC information. For example, at this time, based on the stop of the timer, the triggered IUC information reporting procedure may be canceled. For example, the IUC information may include information related to a preferred resource set and/or information related to a non-preferred resource set.

According to an embodiment of the present disclosure, when generating IUC information (e.g., performing multiplexing), a UE may stop a timer for reporting IUC information. Also, for example, when a UE stops the timer for reporting IUC information as described above, the UE may cancel the triggered reporting operation of the IUC information. Or, for example, the reporting operation of the triggered IUC information may be canceled when a timer for reporting the IUC information expires.

Figure 9:
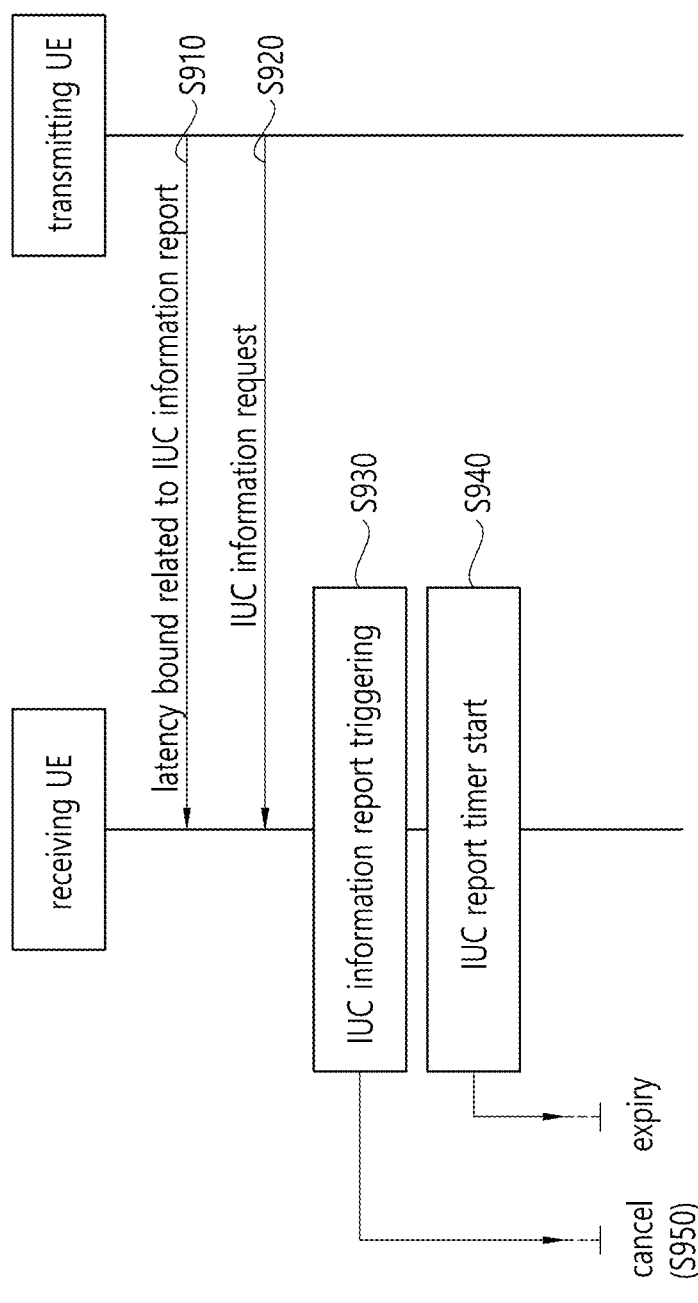
FIG. 9 shows an IUC information reporting procedure of a receiving UE, according to an embodiment of the present disclosure.

FIG. 9 shows an IUC information reporting procedure of a receiving UE, according to an embodiment of the present disclosure. The embodiment of FIG. 9 may be combined with various embodiments of the present disclosure.

Referring to FIG. 9, in step S910, a transmitting UE may transmit a latency bound related to an IUC information report to a receiving UE. For example, the latency bound may be transmitted through RRC signaling. For example, the receiving UE may set a timer value for reporting the IUC information to be the same as the latency bound.

In step S920, the transmitting UE may transmit an IUC information request to the receiving UE. In step S930, the receiving UE may trigger an IUC information reporting procedure based on the reception of the IUC information request (or the fulfillment of a condition related to the IUC information reporting procedure). In step S940, the receiving UE may start a timer for reporting the IUC information based on the triggered IUC information reporting procedure.

In this embodiment, it is assumed that the receiving UE does not transmit IUC information until the timer for reporting the IUC information expires. For example, the timer may expire based on reaching a timer value set equal to the latency bound. In this case, in step S950, the receiving UE may cancel the triggered IUC information reporting procedure based on the expiration of the timer.

According to an embodiment of the present disclosure, by allowing IUC information to be received based on a timer, a transmitting UE can prevent resource selection from being delayed, by selecting a resource based on IUC information, more efficient SL communication may be performed.

FIG. 10 shows a procedure in which a first device performs wireless communication, according to an embodiment of the present disclosure. The embodiment of FIG. 10 may be combined with various embodiments of the present disclosure.

Referring to FIG. 10, in step S1010, a first device may receive, from a second device, latency bound related to an inter UE coordination (IUC) information report. In step S1020, the first device may receive, from the second device, an IUC request. In step S1030, the first device may trigger the IUC information report, based on the IUC request. In step S1040, the first device may start an IUC report timer related to a transmission of IUC information, based on the triggered IUC information report. For example, a timer value of the IUC report timer may be the same as the latency bound. In step S1050, the first device may transmit, to the second device, the IUC information, based on the IUC report timer being running. In step S1060, the first device may stop the IUC report timer, based on the IUC information being transmitted. In step S1070, the first device may cancel the triggered IUC information report, based on the IUC information being transmitted.

For example, additionally, the first device may cancel the triggered IUC information report, based on expiry of the IUC report timer.

For example, the latency bound may be received based on a radio resource control (RRC) signaling.

For example, additionally, the first device may configure the timer value to the same value as the latency bound.

For example, the IUC report timer may be expired based on the IUC report timer reaching the timer value.

For example, the IUC information may be transmitted based on the first device having already selected a transmission resource for transmitting the IUC information.

For example, the IUC information may be transmitted based on the transmission of the IUC information being triggered from a higher layer of the first device.

For example, the IUC information may be transmitted based on the transmission of the IUC information being triggered from a medium access control (MAC) layer of the first device.

For example, the IUC information may be transmitted based on the IUC information including a non-preferred resource set information.

For example, the IUC information may be transmitted while being included in a MAC control element (CE).

For example, a first SL transmission resource for transmission of first SL data may be selected based on the IUC information.

For example, additionally, the first device may receive, from the second device, sidelink control information (SCI) for scheduling of a physical sidelink shared channel (PSSCH) through a physical sidelink control channel (PSCCH), based on the first SL transmission resource; and receive, from the second device, the first SL data through the PSSCH, based on the first SL transmission resource.

For example, the IUC request may be received multiplexed with second SL data, and a pair of a source ID and a destination ID related to the second SL data may be the same as a pair of a source ID and a destination ID related to the first SL data.

The above-described embodiment can be applied to various devices to be described below. First, a processor 102 of a first device 100 may control a transceiver 106 to receive, from a second device 200, latency bound related to an inter UE coordination (IUC) information report. And, the processor 102 of the first device 100 may control the transceiver 106 to receive, from the second device 200, an IUC request. And, the processor 102 of the first device 100 may trigger the IUC information report, based on the IUC request. And, the processor 102 of the first device 100 may start an IUC report timer related to a transmission of IUC information, based on the triggered IUC information report. For example, a timer value of the IUC report timer may be the same as the latency bound. And, the processor 102 of the first device 100 may control the transceiver 106 to transmit, to the second device 200, the IUC information, based on the IUC report timer being running. And, the processor 102 of the first device 100 may stop the IUC report timer, based on the IUC information being transmitted. And, the processor 102 of the first device 100 may cancel the triggered IUC information report, based on the IUC information being transmitted.

According to an embodiment of the disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: receive, from a second device, latency bound related to an inter UE coordination (IUC) information report; receive, from the second device, an IUC request; trigger the IUC information report, based on the IUC request; start an IUC report timer related to a transmission of IUC information, based on the triggered IUC information report, wherein a timer value of the IUC report timer may be the same as the latency bound; transmit, to the second device, the IUC information, based on the IUC report timer being running; stop the IUC report timer, based on the IUC information being transmitted; and cancel the triggered IUC information report, based on the IUC information being transmitted.

For example, additionally, the first device may cancel the triggered IUC information report, based on expiry of the IUC report timer.

For example, the latency bound may be received based on a radio resource control (RRC) signaling.

For example, additionally, the first device may configure the timer value to the same value as the latency bound.

For example, the IUC report timer may be expired based on the IUC report timer reaching the timer value.

For example, the IUC information may be transmitted based on the first device having already selected a transmission resource for transmitting the IUC information.

For example, the IUC information may be transmitted based on the transmission of the IUC information being triggered from a higher layer of the first device.

For example, the IUC information may be transmitted based on the transmission of the IUC information being triggered from a medium access control (MAC) layer of the first device.

For example, the IUC information may be transmitted based on the IUC information including a non-preferred resource set information.

For example, the IUC information may be transmitted while being included in a MAC control element (CE).

For example, a first SL transmission resource for transmission of first SL data may be selected based on the IUC information.

For example, additionally, the first device may receive, from the second device, sidelink control information (SCI) for scheduling of a physical sidelink shared channel (PSSCH) through a physical sidelink control channel (PSCCH), based on the first SL transmission resource; and receive, from the second device, the first SL data through the PSSCH, based on the first SL transmission resource.

For example, the IUC request may be received multiplexed with second SL data, and a pair of a source ID and a destination ID related to the second SL data may be the same as a pair of a source ID and a destination ID related to the first SL data.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: receive, from a second UE, latency bound related to an inter UE coordination (IUC) information report; receive, from the second UE, an IUC request; trigger the IUC information report, based on the IUC request; start an IUC report timer related to a transmission of IUC information, based on the triggered IUC information report, wherein a timer value of the IUC report timer may be the same as the latency bound; transmit, to the second UE, the IUC information, based on the IUC report timer being running; stop the IUC report timer, based on the IUC information being transmitted; and cancel the triggered IUC information report, based on the IUC information being transmitted.

According to an embodiment of the present disclosure, a non-transitory computer-readable storage medium storing instructions may be proposed. For example, the instructions, when executed, may cause a first device to: receive, from a second device, latency bound related to an inter UE coordination (IUC) information report; receive, from the second device, an IUC request; trigger the IUC information report, based on the IUC request; start an IUC report timer related to a transmission of IUC information, based on the triggered IUC information report, wherein a timer value of the IUC report timer may be the same as the latency bound; transmit, to the second device, the IUC information, based on the IUC report timer being running; stop the IUC report timer, based on the IUC information being transmitted; and cancel the triggered IUC information report, based on the IUC information being transmitted.

Figure 11:
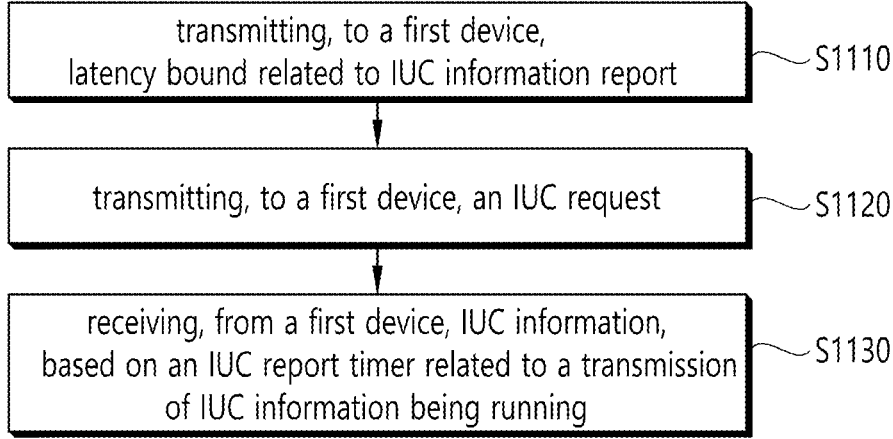
FIG. 11 shows a procedure in which a second device performs wireless communication, according to an embodiment of the present disclosure.

FIG. 11 shows a procedure in which a second device performs wireless communication, according to an embodiment of the present disclosure. The embodiment of FIG. 11 may be combined with various embodiments of the present disclosure.

Referring to FIG. 11, in step S1110, a second device may transmit, to a first device, latency bound related to an inter UE coordination (IUC) information report. In step S1120, the second device may transmit, to the first device, an IUC request. In step S1130, the second device may receive, from the first device, IUC information, based on an IUC report timer related to a transmission of the IUC information being running. For example, the IUC information report may be triggered based on the IUC request, the IUC report timer may be started based on the triggered IUC information report, a timer value of the IUC report timer may be the same as the latency bound, the IUC report timer may be stopped based on the IUC information being transmitted from the first device, and the triggered IUC information report may be canceled based on the IUC information being transmitted from the first device.

For example, the timer value may be set to the same value as the latency bound, by the first device.

The above-described embodiment can be applied to various devices to be described below. First, a processor 202 of a second device 200 may control a transceiver 206 to transmit, to a first device 100, latency bound related to an inter UE coordination (IUC) information report. And, the processor 202 of the second device 200 may control the transceiver 206 to transmit, to the first device 100, an IUC request. And, the processor 202 of the second device 200 may control the transceiver 206 to receive, from the first device 100, IUC information, based on an IUC report timer related to a transmission of the IUC information being running. For example, the IUC information report may be triggered based on the IUC request, the IUC report timer may be started based on the triggered IUC information report, a timer value of the IUC report timer may be the same as the latency bound, the IUC report timer may be stopped based on the IUC information being transmitted from the first device 100, and the triggered IUC information report may be canceled based on the IUC information being transmitted from the first device 100.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: transmit, to a first device, latency bound related to an inter UE coordination (IUC) information report; transmit, to the first device, an IUC request; and receive, from the first device, IUC information, based on an IUC report timer related to a transmission of the IUC information being running, wherein the IUC information report may be triggered based on the IUC request, wherein the IUC report timer may be started based on the triggered IUC information report, wherein a timer value of the IUC report timer may be the same as the latency bound, wherein the IUC report timer may be stopped based on the IUC information being transmitted from the first device, and wherein the triggered IUC information report may be canceled based on the IUC information being transmitted from the first device.

For example, the timer value may be set to the same value as the latency bound, by the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
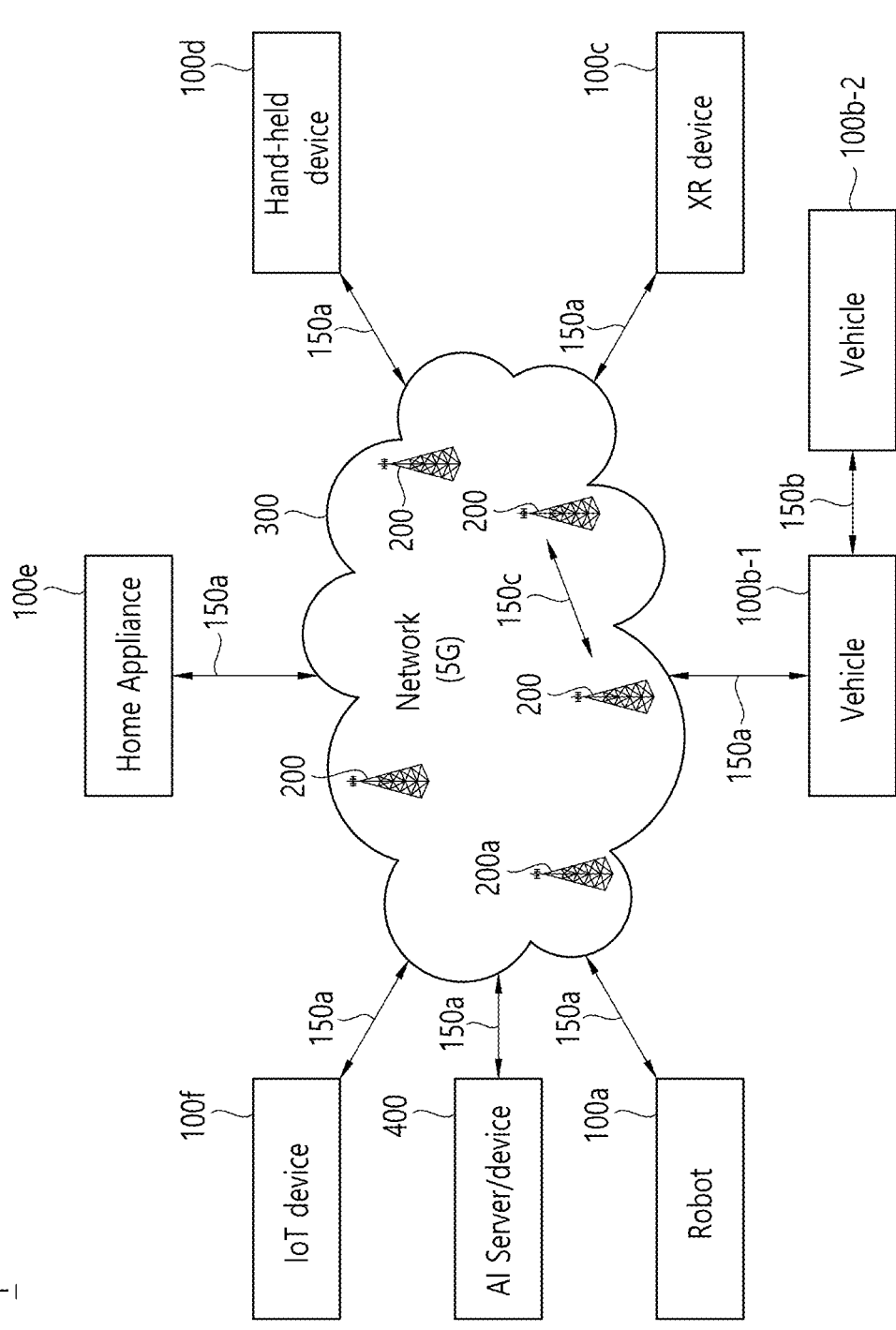
FIG. 12 shows a communication system 1, based on an embodiment of the present disclosure.

FIG. 12 shows a communication system 1, based on an embodiment of the present disclosure. The embodiment of FIG. 12 may be combined with various embodiments of the present disclosure.

Referring to FIG. 12, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
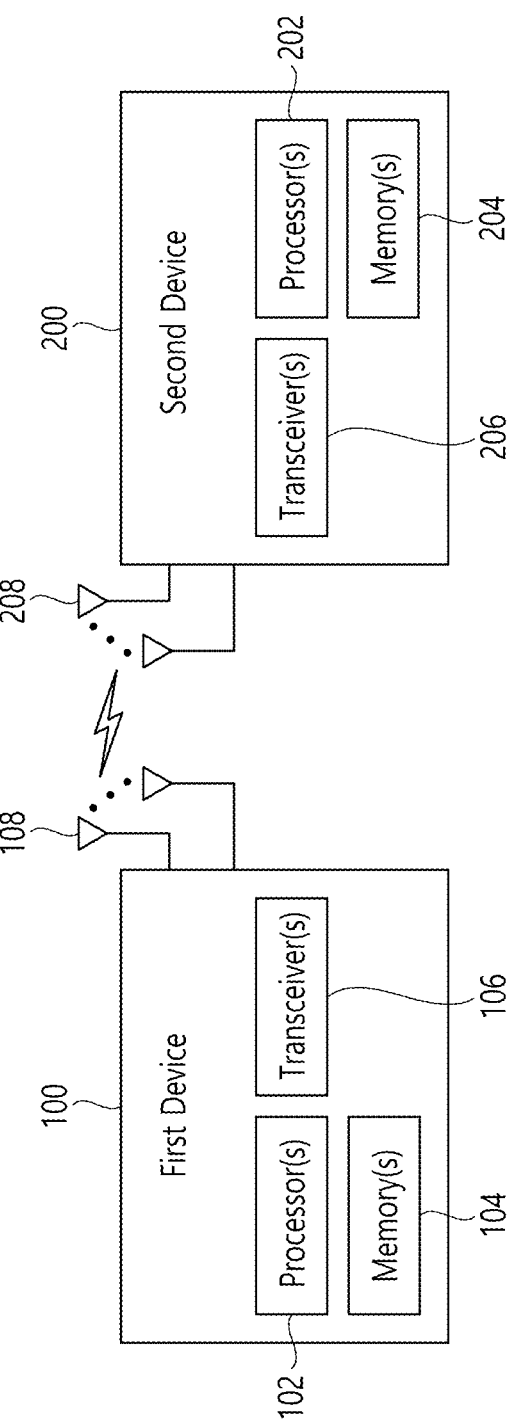
FIG. 13 shows wireless devices, based on an embodiment of the present disclosure.

FIG. 13 shows wireless devices, based on an embodiment of the present disclosure. The embodiment of FIG. 13 may be combined with various embodiments of the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
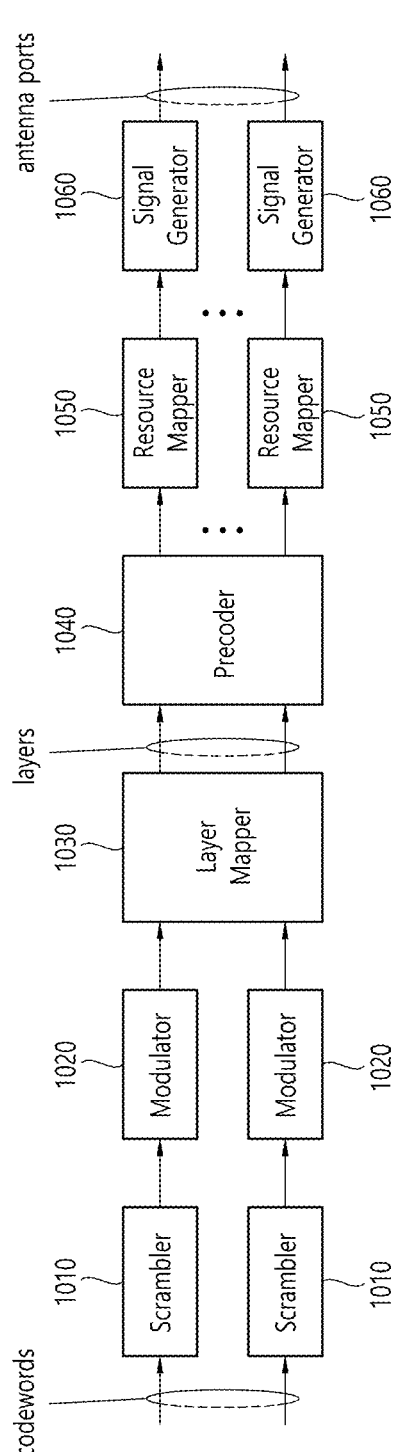
FIG. 14 shows a signal process circuit for a transmission signal, based on an embodiment of the present disclosure.

FIG. 14 shows a signal process circuit for a transmission signal, based on an embodiment of the present disclosure. The embodiment of FIG. 14 may be combined with various embodiments of the present disclosure.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 15:
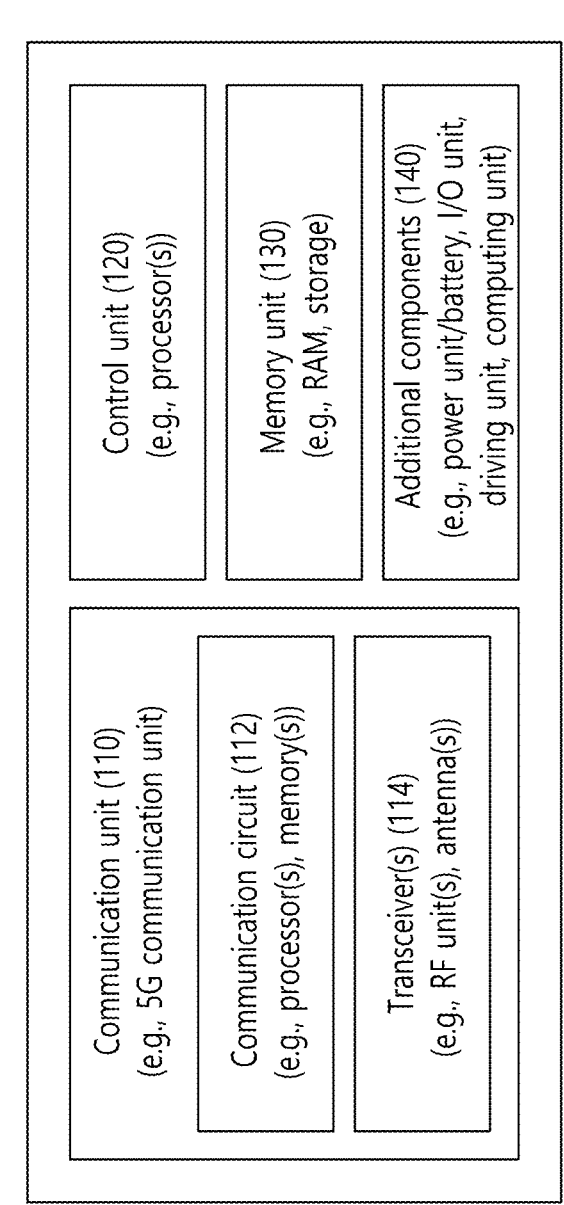
FIG. 15 shows another example of a wireless device, based on an embodiment of the present disclosure.

FIG. 15 shows another example of a wireless device, based on an embodiment of the present disclosure. The wireless device may be implemented in various forms according to a use-case/service (refer to FIG. 12). The embodiment of FIG. 15 may be combined with various embodiments of the present disclosure.

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Figure 16:
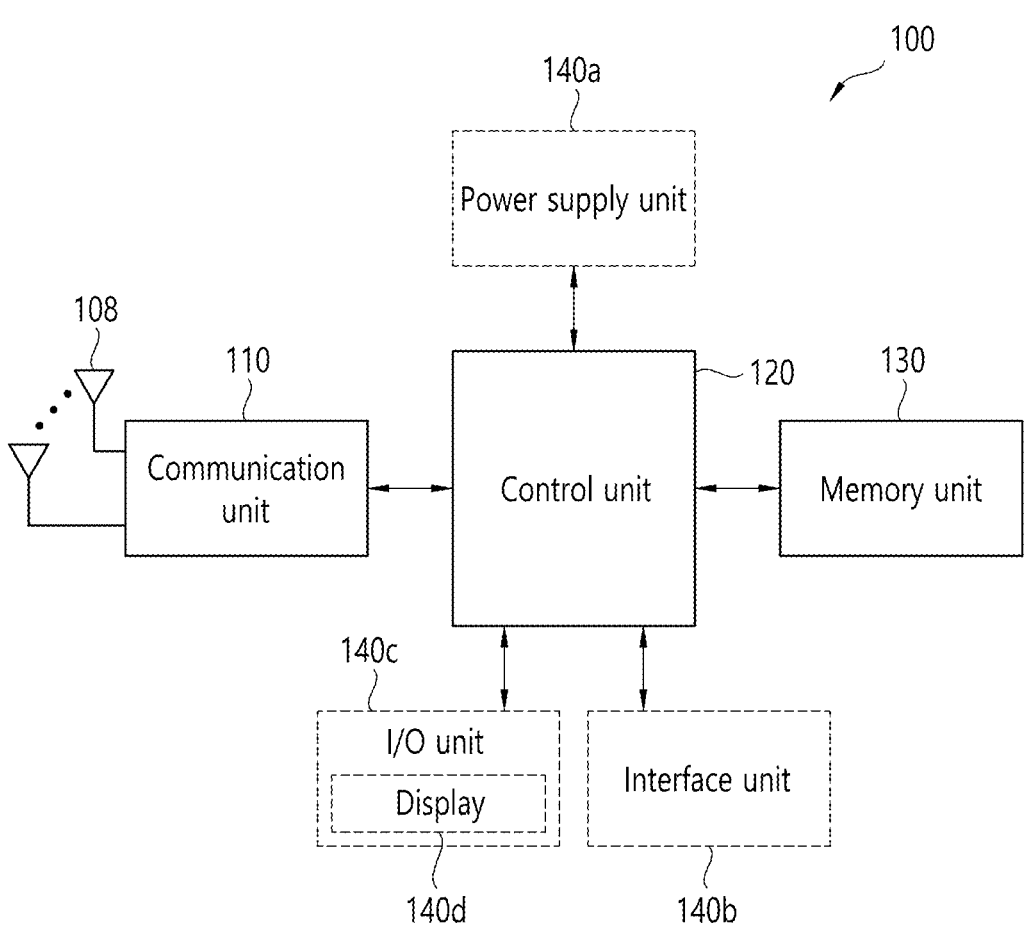
FIG. 16 shows a hand-held device, based on an embodiment of the present disclosure.

FIG. 16 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 16 may be combined with various embodiments of the present disclosure.

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 17:
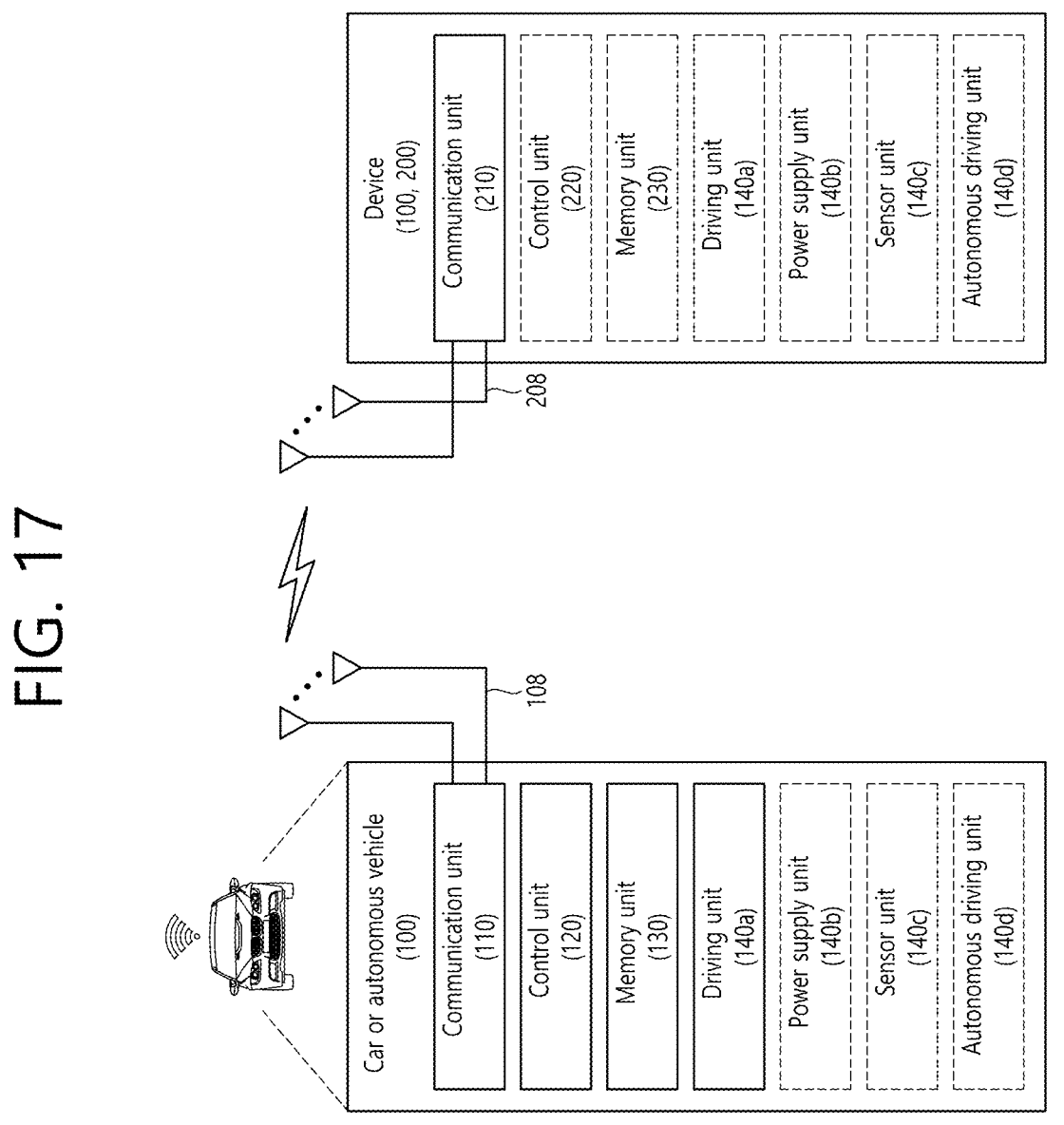

FIG. 17 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 17 may be combined with various embodiments of the present disclosure.

Referring to FIG. 17, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
   receiving, from a second device, latency bound related to an inter UE coordination (IUC) information report;
   receiving, from the second device, an IUC request;
   triggering the IUC information report, based on the IUC request;
   determining to include non-preferred resource set information into IUC information;
   determining to apply a timer-based mechanism to the triggered IUC information report,
   wherein the timer-based mechanism is applied to the IUC information report when the non-preferred resource set information is included in the IUC information;

starting an IUC report timer related to a transmission of the IUC information, based on the timer-based mechanism being applied to the triggered IUC information report,
   wherein a timer value of the IUC report timer is the same as the latency bound;
   transmitting, to the second device, the IUC information, based on the IUC report timer being running;
   stopping the IUC report timer, based on the IUC information being transmitted; and
   canceling the triggered IUC information report, based on the IUC information being transmitted.

2. The method of claim 1, further comprising:
   canceling the triggered IUC information report, based on expiry of the IUC report timer.

3. The method of claim 1, wherein the latency bound is received based on a radio resource control (RRC) signaling.

4. The method of claim 1, further comprising:
   configuring the timer value to the same value as the latency bound.

5. The method of claim 1, wherein the IUC report timer is expired based on the IUC report timer reaching the timer value.

6. The method of claim 1, wherein the IUC information is transmitted based on a first device having already selected a transmission resource for transmitting the IUC information.

7. The method of claim 1, wherein the IUC information is transmitted based on the transmission of the IUC information being triggered from a higher layer of a first device.

8. The method of claim 1, wherein the IUC information is transmitted based on the transmission of the IUC information being triggered from a medium access control (MAC) layer of a first device.

9. The method of claim 1, wherein the IUC information is transmitted based on the IUC information including a non-preferred resource set information.

10. The method of claim 1, wherein the IUC information is transmitted while being included in a MAC control element (CE).

11. The method of claim 1, wherein a first SL transmission resource for transmission of first SL data is selected based on the IUC information.

12. The method of claim 11, further comprising:
   receiving, from the second device, sidelink control information (SCI) for scheduling of a physical sidelink shared channel (PSSCH) through a physical sidelink control channel (PSCCH), based on the first SL transmission resource; and
   receiving, from the second device, the first SL data through the PSSCH, based on the first SL transmission resource.

13. The method of claim 11, wherein the IUC request is received multiplexed with second SL data, and
   wherein a pair of a source ID and a destination ID related to the second SL data is the same as a pair of a source ID and a destination ID related to the first SL data.

14. A first device comprising:
   one or more memories storing instructions;
   one or more transceivers; and
   one or more processors connected to the one or more memories and the one or more transceivers,
   wherein the instructions, based on being executed by the one or more processors, cause the first device to:
   receive, from a second device, latency bound related to an inter UE coordination (IUC) information report;
   receive, from the second device, an IUC request;

trigger the IUC information report, based on the IUC request;

determine to include non-preferred resource set information into IUC information;

determine to apply a timer-based mechanism to the triggered IUC information report, wherein the timer-based mechanism is applied to the IUC information report when the non-preferred resource set information is included in the IUC information;

start an IUC report timer related to a transmission of the IUC information, based on the timer-based mechanism being applied to the triggered IUC information report, wherein a timer value of the IUC report timer is the same as the latency bound;

transmit, to the second device, the IUC information, based on the IUC report timer being running;

stop the IUC report timer, based on the IUC information being transmitted; and cancel the triggered IUC information report, based on the IUC information being transmitted.

15. A processing device adapted to control a first device, the processing device comprising:

one or more processors; and one or more memories connectable to the one or more processors and storing instructions, wherein the instructions, based on being executed by the one or more processors, cause the first device to:

receive, from a second device, latency bound related to an inter UE coordination (IUC) information report;

receive, from the second device, an IUC request;

trigger the IUC information report, based on the IUC request;

determine to include non-preferred resource set information into IUC information;

determine to apply a time-based mechanism to the triggered IUC information report, wherein the timer-based mechanism is applied to the IUC information report when the non-preferred resource set information is included in the IUC information;

start an IUC report timer related to a transmission of the IUC information, based on the timer-based mechanism being applied to the triggered IUC information report, wherein a timer value of the IUC report timer is the same as the latency bound;

transmit, to the second device, the IUC information, based on the IUC report timer being running;

stop the IUC report timer, based on the IUC information being transmitted; and cancel the triggered IUC information report, based on the IUC information being transmitted.

* * * * *